United States Patent
Zhang et al.

(10) Patent No.: US 10,116,206 B2
(45) Date of Patent: Oct. 30, 2018

(54) LOOP COMPENSATION CIRCUIT AND SWITCHING POWER SUPPLY CIRCUIT

(71) Applicant: Shenzhen China Star Optoelectronics Technology Co., Ltd., Shenzhen, Guangdong (CN)

(72) Inventors: Xianming Zhang, Guangdong (CN); Dan Cao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 379 days.

(21) Appl. No.: 14/904,742

(22) PCT Filed: Oct. 29, 2015

(86) PCT No.: PCT/CN2015/093172
§ 371 (c)(1),
(2) Date: Jan. 13, 2016

(87) PCT Pub. No.: WO2017/049710
PCT Pub. Date: Mar. 30, 2017

(65) Prior Publication Data
US 2017/0237343 A1    Aug. 17, 2017

(30) Foreign Application Priority Data
Sep. 23, 2015 (CN) .......................... 2015 1 0612705

(51) Int. Cl.
*H02M 3/156* (2006.01)
*H02M 1/08* (2006.01)

(52) U.S. Cl.
CPC ............. *H02M 3/156* (2013.01); *H02M 1/08* (2013.01)

(58) Field of Classification Search
CPC ................................. H02M 1/08; H02M 3/156
See application file for complete search history.

(56) References Cited

U.S. PATENT DOCUMENTS 7,880,446 B2 *  2/2011  Chen ..................... H02M 3/156
                                                    320/166
8,564,266 B2 * 10/2013  Pracht ................... H02M 3/156
                                                    323/283

(Continued)

FOREIGN PATENT DOCUMENTS

CN            1943099 A     4/2007
CN          101785173 A     7/2010

(Continued)

*Primary Examiner* — Patrick O'Neill
(74) *Attorney, Agent, or Firm* — Andrew C. Cheng

(57) ABSTRACT

The embodiment of the present invention discloses a loop compensation circuit and a switching power supply circuit. The loop compensation circuit can comprise: a voltage detection circuit, a control chip and a RC circuit, and the voltage detection circuit is coupled to a voltage generation circuit, and employed to detect a variation of an output voltage of the voltage generation circuit; the control chip is respectively coupled to the voltage detection circuit and the RC circuit, and employed to detect a response speed of the loop compensation circuit and to adjust a parameter of the RC circuit according to the response speed of the loop compensation circuit and the variation of the output voltage of the voltage generation circuit for adjusting the response speed of the loop compensation circuit.

10 Claims, 3 Drawing Sheets

(56) References Cited

U.S. PATENT DOCUMENTS

| | | | | |
|---|---|---|---|---|
| 8,786,268 B2* | 7/2014 | Li | .................. | H02M 3/156 |
| | | | | 323/283 |
| 9,343,962 B2* | 5/2016 | Cheng | .................. | H02M 3/156 |
| 9,590,502 B2* | 3/2017 | Rozek | .................. | H02M 3/156 |
| 2015/0180335 A1 | 6/2015 | Takada et al. | | |

FOREIGN PATENT DOCUMENTS

| | | | |
|---|---|---|---|
| CN | 102237810 | A | 11/2011 |
| CN | 103036439 | A | 4/2013 |
| CN | 103825439 | A | 5/2014 |
| CN | 104066251 | A | 9/2014 |
| CN | 204290451 | U | 4/2015 |
| JP | 2001102922 | A | 4/2001 |

* cited by examiner

LOOP COMPENSATION CIRCUIT AND SWITCHING POWER SUPPLY CIRCUIT

CROSS REFERENCE

This application claims the priority of Chinese Patent Application No. 201510612705.3, entitled "Loop compensation circuit and switching power supply circuit", filed on Sep. 23, 2015, the disclosure of which is incorporated herein by reference in its entirety.

FIELD OF THE INVENTION

The present invention relates to an integrated circuit field, and more particularly to a loop compensation circuit and a switching power supply circuit.

BACKGROUND OF THE INVENTION

The switching power supply is a kind of power supply of utilizing the modern power electronic technology to control the on and off time ratio of the switching transistor to maintain the steady output voltage. Generally, the Pulse Width Modulation (PWM) is employed in the switching power supply, and the output voltage is maintained to be steady with the loop compensation for reducing the generation of the ripple.

In the switching power supply in prior art, the loop compensation circuit is commonly set to perform a fixed compensation to the output voltage. However in practical application, the input voltage and the loading often change from time to time, thus the output voltage also varies from time to time. If the fixed compensation is utilized, and the compensation speed and the variation rate of the output voltage are not consistent, not only the generation of the ripple cannot be reduced but it also results in that the output voltage has spiked and intensifies the unsteadiness of the output voltage.

SUMMARY OF THE INVENTION

The embodiment of the present invention provides a loop compensation circuit and a switching power supply circuit, in which the response speed of the loop compensation circuit can be adjusted in real time to effectively reduce or eliminate the ripple and to raise the stability of the output voltage.

First, the embodiment of the present invention provides a loop compensation circuit, wherein the loop compensation circuit comprises a voltage detection circuit, a control chip and a RC circuit, wherein:

the voltage detection circuit is coupled to a voltage generation circuit, and employed to detect a variation of an output voltage of the voltage generation circuit;

the control chip is respectively coupled to the voltage detection circuit and the RC circuit, and employed to detect a response speed of the loop compensation circuit and to adjust a parameter of the RC circuit according to the response speed of the loop compensation circuit and the variation of the output voltage of the voltage generation circuit for adjusting the response speed of the loop compensation circuit.

In some possible embodiments, the RC circuit comprises a resistance circuit, a capacitance circuit and a switching circuit, wherein:

the switching circuit is respectively coupled to the control chip, the resistance circuit and the capacitance circuit, and employed to be on or off according to a control signal outputted by the control chip to adjust a resistance value of the resistance circuit and a capacitance value of the capacitance circuit.

In some possible embodiments, the resistance circuit comprises at least two resistances, and the capacitance circuit comprises at least two capacitances, and the switching circuit comprises at least two switching transistors;

at least one resistance in the at least two resistances is coupled to at least one switching transistor in the switching circuit in series or in parallel; at least one capacitance in the at least two capacitances is coupled to at least one switching transistor in the switching circuit in series or in parallel.

In some possible embodiments, the control chip comprises a control circuit and a PWM output circuit, wherein:

the control circuit is coupled to the voltage detection circuit, the RC circuit and the PWM output circuit, and employed to detect the response speed of the loop compensation circuit, and to control a Pulse Width Modulation PWM signal outputted by the PWM output circuit according to response speed of the loop compensation circuit and a variation of the output voltage;

the PWM output circuit comprises at least two PWM output ends, and the at least two PWM output ends are coupled to the at least two switching transistors, and employed to respectively output PWM signals to the at least two switching transistors for controlling the at least two switching transistors to be on or off.

In some possible embodiments, the resistance circuit comprises a first resistance, a second resistance and a third resistance, and the switching circuit comprises a first switching transistor and a second switching transistor, wherein:

the first resistance and the first switching transistor in parallel are coupled between the control circuit and one end of the second resistance in series;

the third resistance and the second switching transistor are coupled between the control circuit and the other end of the second resistance in series;

the first switching transistor and a second switching transistor are respectively coupled to the at least two PWM output ends.

In some possible embodiments, the resistance circuit comprises a first resistance, a second resistance and a third resistance, and the switching circuit comprises a first switching transistor and a second switching transistor, wherein:

the first resistance and the first switching transistor in parallel are coupled between the control circuit and one end of the second resistance in series;

the third resistance and the second switching transistor are coupled between the control circuit and the other end of the second resistance in series;

the first switching transistor and a second switching transistor are respectively coupled to the at least two PWM output ends.

In some possible embodiments, the capacitance circuit comprises a first capacitance, a second capacitance and a third capacitance, and the switching circuit comprises a third switching transistor and a fourth switching transistor, wherein:

the first capacitance and the third switching transistor in parallel are coupled between the control chip and one end of the second capacitance in series;

the third resistance and the second switching transistor are coupled between the control circuit and the other end of the second resistance in series;

In some possible embodiments, the at least two PWM output ends comprises a third PWM output end and a fourth PWM output end, and the third switching transistor and the fourth switching transistor are MOS transistors;

a gate of the third switching transistor is coupled to the third PWM output end, and a source and a drain of the third switching transistor are coupled to two ends of the first capacitance;

the one end of the first capacitance is grounded, and the other end is coupled to one end of the second capacitance, and the other end of the second capacitance is coupled to one end of the third capacitance and the resistance circuit;

a gate of the fourth switching transistor is coupled to the fourth PWM output end, and a source of the fourth switching transistor is grounded, and a drain of the fourth switching transistor is coupled to the other end of the third capacitance.

In some possible embodiments, the voltage detection circuit is a differentiating circuit.

Second, the embodiment of the present invention provides a switching power supply circuit, wherein the switching power supply circuit comprises a voltage generation circuit and a loop compensation circuit, and the loop compensation circuit comprises a voltage detection circuit, a control chip and a RC circuit, wherein:

In the embodiment of the present invention, the loop compensation circuit comprises a voltage detection circuit, a control chip and a RC circuit, wherein the voltage detection circuit is coupled to a voltage generation circuit, and employed to detect a variation of an output voltage of the voltage generation circuit; the control chip is respectively coupled to the voltage detection circuit and the RC circuit, and employed to detect a response speed of the loop compensation circuit and to adjust a parameter of the RC circuit according to the response speed of the loop compensation circuit and the variation of the output voltage of the voltage generation circuit for adjusting the response speed of the loop compensation circuit. By employing the embodiment of the present invention, the response speed of the loop compensation circuit can be adjusted in real time to effectively reduce or eliminate the ripple and to raise the stability of the output voltage.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

The embodiment of the present invention provides a loop compensation circuit, which can effectively reduce or eliminate the ripple and raise the stability of the output voltage. The embodiment of the present invention will be further described in detail with the accompanying drawings.

Figure 1:
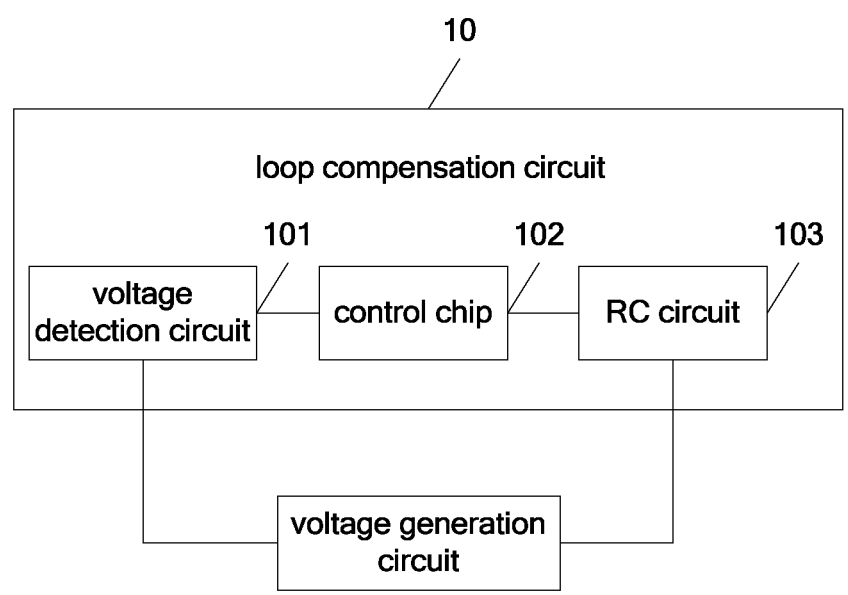
FIG. 1 is a structure diagram of one embodiment of a loop compensation circuit provided by the embodiment of the present invention.

Please refer to FIG. 1, which is a structure diagram of one embodiment of a loop compensation circuit provided by the embodiment of the present invention. As shown in FIG. 1, the loop compensation circuit 10 can comprise a voltage detection circuit 101, a control chip 102 and a RC circuit 103.

The voltage detection circuit 101 is coupled to a voltage generation circuit, and employed to detect a variation of an output voltage of the voltage generation circuit.

In the specific embodiment, the voltage generation circuit is the circuit providing the voltage. The loop compensation circuit 10 according to the embodiment of the present invention is employed to adjust the compensated dynamic response according to the variation of the voltage outputted by the voltage generation circuit to prevent the generation of the ripple. Selectably, the voltage generation circuit can be a boost circuit or a buck circuit.

The voltage detection circuit 101 is coupled to a voltage generation circuit and the control chip 102, and employed to detect a variation of an output voltage of the voltage generation circuit, and output the variation to the control chip 102.

The control chip 102 is respectively coupled to the voltage detection circuit 101 and the RC circuit 103, and employed to detect a response speed of the loop compensation circuit 10 and to adjust a parameter of the RC circuit 103 according to the response speed of the loop compensation circuit 10 and the variation of the output voltage for adjusting the response speed of the loop compensation circuit 10.

In the specific embodiment, the response speed of the loop compensation circuit 10 is determined by parameters of resistance value, capacitance value of the RC circuit 103. The control chip 102 is coupled to the voltage detection circuit 101 and the RC circuit 103 and can receive the variation of the output voltage detected by the voltage detection circuit 101 and detect the response speed of the loop compensation circuit 10. The control chip 102 can adjust a parameter of the RC circuit 103 according to the detected variation of the output voltage of the voltage generation circuit and the response speed of the loop compensation circuit 10 for adjusting the response speed of the loop compensation circuit 10. When the response speed of the loop compensation circuit 10 is close to or consistent with a variation rate of the output voltage of the voltage generation circuit, it can effectively reduce or eliminate the ripple and to raise the stability of the output voltage.

In the embodiment of the present invention, the loop compensation circuit comprises a voltage detection circuit, a control chip and a RC circuit, wherein the voltage detection circuit is coupled to a voltage generation circuit, and employed to detect a variation of an output voltage of the voltage generation circuit; the control chip is respectively coupled to the voltage detection circuit and the RC circuit, and employed to detect a response speed of the loop compensation circuit and to adjust a parameter of the RC circuit according to the response speed of the loop compensation circuit and the variation of the output voltage of the voltage generation circuit for adjusting the response speed of the loop compensation circuit. By employing the embodiment of the present invention, the response speed of the loop compensation circuit can be adjusted in real time to effectively reduce or eliminate the ripple and to raise the stability of the output voltage.

Figure 2:
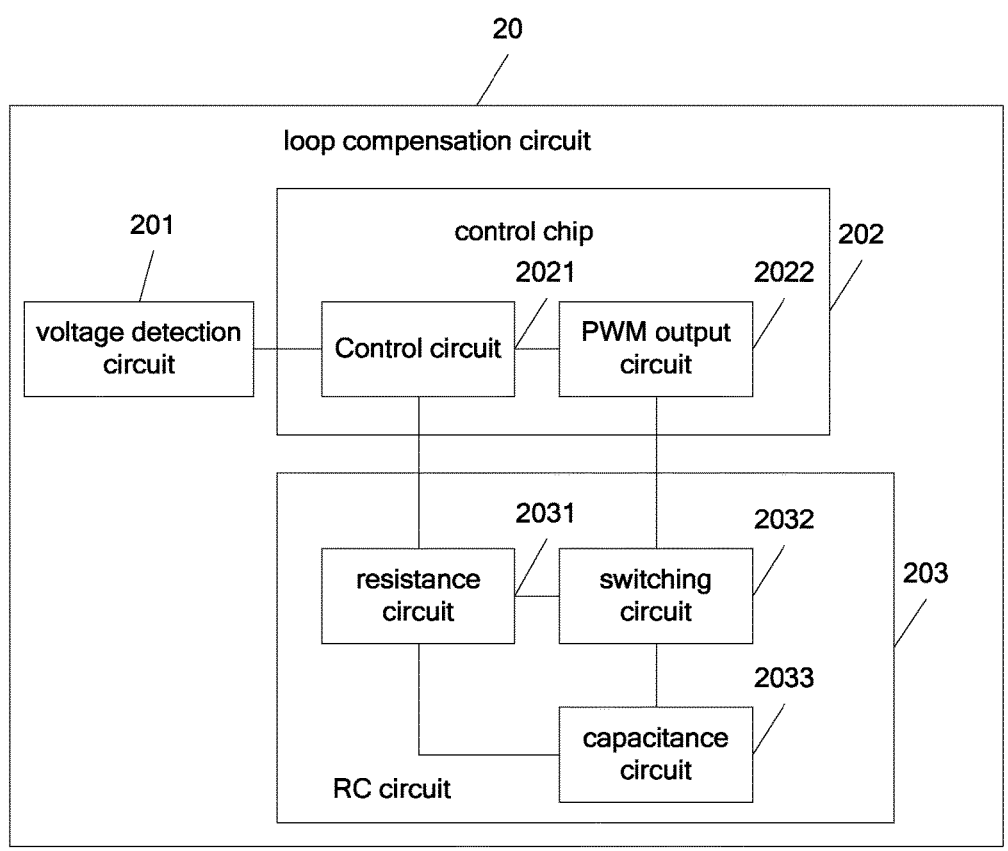
FIG. 2 is a structure diagram of another embodiment of a loop compensation circuit provided by the embodiment of the present invention.

Please refer to FIG. 2, which is a structure diagram of another embodiment of a loop compensation circuit provided by the embodiment of the present invention. AS shown in FIG. 2, the loop compensation circuit 20 can comprise a voltage detection circuit 201, a control chip 202 and a RC circuit 203, wherein the control chip 202 can comprise a control circuit 2021 and a PWM output circuit 2022, and the RC circuit can comprise a resistance circuit 2031, a capacitance circuit 2032 and a switching circuit 2033.

The voltage detection circuit 201 is coupled to a voltage generation circuit, and employed to detect a variation of an output voltage of the voltage generation circuit.

In the specific embodiment, the voltage generation circuit is the circuit providing the voltage. The loop compensation circuit 20 according to the embodiment of the present invention is employed to adjust the compensated dynamic response according to the variation of the voltage outputted by the voltage generation circuit to prevent the generation of the ripple. Selectably, the voltage generation circuit can be a boost circuit or a buck circuit.

The voltage detection circuit 201 is coupled to a voltage generation circuit and the control chip 202, and employed to detect a variation of an output voltage of the voltage generation circuit, and output the variation to the control chip 202.

In some possible embodiments, the voltage detection circuit 201 can be a differentiating circuit, and performs differentiating calculation to the output voltage of the voltage generation circuit to detect the variation of the output voltage of the voltage generation circuit.

The control chip 202 is respectively coupled to the voltage detection circuit 201 and the RC circuit 203, and employed to detect a response speed of the loop compensation circuit 20 and to adjust a parameter of the RC circuit 203 according to the response speed of the loop compensation circuit 20 and the variation of the output voltage for adjusting the response speed of the loop compensation circuit 20.

In the specific embodiment, the response speed of the loop compensation circuit 20 is determined by parameters of resistance value, capacitance value of the RC circuit 203.

In some possible embodiments, the control chip 202 can comprise a control circuit 2021 and a PWM output circuit 2022, wherein:

The control chip 202 is coupled to the voltage detection circuit 201 and the PWM output circuit 2022, RC circuit 203 and employed to detect a response speed of the loop compensation circuit 20 and to control an PWM signal outputted by the PWM output circuit 2022 according to the response speed of the loop compensation circuit 20 and the variation of the aforesaid output voltage.

the PWM output circuit 2022 comprises at least two PWM output ends, and the at least two PWM output ends are coupled to the at least two switching transistors in the switching circuit 2033, and employed to respectively output PWM signals to the at least two switching transistors for controlling the at least two switching transistors to be on or off.

By controlling the at least two switching transistors to be on or off, the control chip 202 can adjust the parameter of the RC circuit 203 for adjusting the response speed of the loop compensation circuit 20. When the response speed of the loop compensation circuit 20 is close to or consistent with a variation rate of the output voltage of the voltage generation circuit, it can effectively reduce or eliminate the ripple and to raise the stability of the output voltage.

The RC circuit 203 can comprise a resistance circuit 2031, a capacitance circuit 2032 and a switching circuit 2033.

The switching circuit 2033 is respectively coupled to the control chip 202, resistance circuit 2031 and the capacitance circuit 2032, and employed to be on or off according to a control signal outputted by the control chip 202 to adjust a resistance value of the resistance circuit and a capacitance value of the capacitance circuit.

Specifically, the resistance circuit 2031 can comprise at least two resistances, and the capacitance circuit 2032 can comprise at least two capacitances, and the switching circuit 2033 can comprise at least two switching transistors. At least one resistance in the at least two resistances is coupled to at least one switching transistor in the switching circuit in series or in parallel; at least one capacitance in the at least two capacitances is coupled to at least one switching transistor in the switching circuit in series or in parallel.

In the specific embodiment, the control chip 202 can output control signals of the at least two switching transistors to respectively control the at least two switching transistors to be on or off. When the conducted conditions of the at least two switching transistors are different, the different resistances and capacitances can be obtained to change the response period of the RC circuit 203, and thus to adjust the response speed of the loop compensation circuit 20. As an illustration, if the RC circuit 203 comprises two resistances in series and one switching transistor, wherein one resistance is coupled to the switching transistor in series, and as the switching transistor is conducted, the coupled resistance in series is short, and the resistance of the RC circuit 203 is decreased. Moreover, if the RC circuit 203 comprises two resistances and one switching transistor, wherein one resistance is coupled to the switching transistor in series, and then is coupled to the other resistance in parallel, and as the switching transistor is conducted, the two resistances are in parallel, and the resistance of the RC circuit 203 is decreased.

In the embodiment of the present invention, as the resistance value of the RC circuit 203 is larger, and the capacitance is smaller, the response speed of the loop compensation circuit 20 is faster; contrarily, as the resistance value of the RC circuit 203 is smaller, and the capacitance is larger, the response speed of the loop compensation circuit 20 is slower.

In the embodiment of the present invention, the loop compensation circuit comprises a voltage detection circuit, a control chip and a RC circuit, wherein the voltage detection circuit is coupled to a voltage generation circuit, and employed to detect a variation of an output voltage of the voltage generation circuit; the RC circuit comprises a resistance circuit, a capacitance circuit and a switching circuit, and the control chip is respectively coupled to the voltage detection circuit and the RC circuit, and employed to detect a response speed of the loop compensation circuit and to control the switching circuit to be on or off according to the response speed of the loop compensation circuit and the variation of the output voltage for changing a parameter of the RC circuit and thus, for adjusting the response speed of the loop compensation circuit. By employing the embodiment of the present invention, the response speed of the loop compensation circuit can be adjusted in real time to effectively reduce or eliminate the ripple and to raise the stability of the output voltage.

Figure 3:
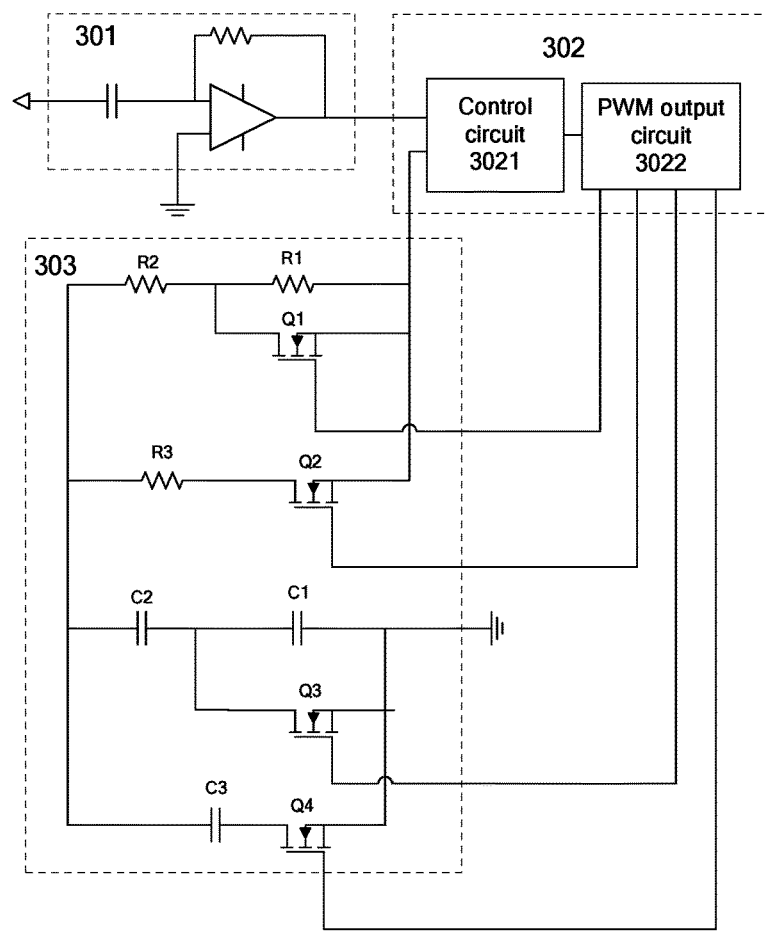
FIG. 3 is a circuit diagram of one embodiment of a loop compensation circuit provided by the embodiment of the present invention.

Please refer to FIG. 3, which is a circuit diagram of one embodiment of a loop compensation circuit provided by the embodiment of the present invention. AS shown in FIG. 3, the loop compensation circuit can comprise a voltage detection circuit 301, a control chip 302 and a RC circuit 303.

The voltage detection circuit 301 is coupled to a voltage generation circuit and the control chip 302, and employed to detect a variation of an output voltage of the voltage generation circuit, and output the variation to the control chip 302.

In some possible embodiments, the voltage detection circuit 301 can be a differentiating circuit, and performs differentiating calculation to the output voltage of the voltage generation circuit to detect the variation of the output voltage of the voltage generation circuit.

The control chip 302 is respectively coupled to the voltage detection circuit 301 and the RC circuit 303, and employed to detect a response speed of the loop compensation circuit and to adjust a parameter of the RC circuit 303 according to the response speed of the loop compensation circuit and the variation of the output voltage for adjusting the response speed of the loop compensation circuit.

Specifically, the control chip can comprise a control circuit 3021 and a PWM output circuit 3022, wherein:

The control circuit 3021 is coupled to the voltage detection circuit 301, the RC circuit 303 and the PWM output circuit 3022, and employed to detect the response speed of the loop compensation circuit, and to control a Pulse Width Modulation PWM signal outputted by the PWM output circuit 3022 according to response speed of the loop compensation circuit 30 and a variation of the output voltage of the voltage generation circuit.

the PWM output circuit 3022 comprises at least two PWM output ends, and the at least two PWM output ends are coupled to the at least two switching transistors, and employed to respectively output PWM signals to the at least two switching transistors for controlling the at least two switching transistors to be on or off.

The RC circuit 303 can comprise a resistance circuit, a capacitance circuit and a switching circuit.

In some possible embodiments, the at least two PWM output ends can comprise a first PWM output end, a second PWM output end, a third PWM output end and a fourth PWM output end. The resistance circuit comprises a first resistance R1, a second resistance R2 and a third resistance R3, and the switching circuit comprises a first switching transistor Q1 and a second switching transistor Q2, wherein:

the first resistance R1 and the first switching transistor Q1 in parallel are coupled between the control circuit 3021 and one end of the second resistance R2 in series;

the third switching transistor R3 and the second switching transistor Q2 are coupled between the control chip 3021 and the other end of the second capacitance R2 in series;

the first switching transistor Q1 and the second switching transistor Q2 are respectively coupled to the first PWM output end and the second PWM output end.

The capacitance circuit comprises a first capacitance C1, a second capacitance C2 and a third capacitance C3, wherein:

the first capacitance C1 and the third switching transistor Q3 in parallel are coupled between the control chip 3021 and one end of the second capacitance C2 in series;

the third capacitance C3 and the fourth switching transistor Q4 are coupled between the control chip 3021 and the other end of the second capacitance C2 in series.

In some possible embodiments, the third switching transistor Q3 and the fourth switching transistor Q4 are MOS transistors; a gate of the third switching transistor Q3 is coupled to the third PWM output end, and a source and a drain of the third switching transistor Q3 are coupled to two ends of the first capacitance C1; the one end of the first capacitance C1 is grounded, and the other end is coupled to one end of the second capacitance C2, and the other end of the second capacitance C2 is coupled to one end of the third capacitance C3 and the resistance circuit; a gate of the fourth switching transistor Q4 is coupled to the fourth PWM output end, and a source of the fourth switching transistor Q4 is grounded, and a drain of the fourth switching transistor Q4 is coupled to the other end of the third capacitance C3.

In the specific embodiment, if the first switching transistor Q1 or the second switching transistor Q2 is conducted, the resistance value of the resistance circuit can be enlarged; if the third switching transistor Q3 or the fourth switching transistor Q4 is conducted, the capacitance value of the capacitance circuit can be diminished to increase the response speed of the RC circuit 303 (shortening the response period), and contrarily, to decrease the response speed of the RC circuit 303 (extending the response period). Therefore, by controlling the first switching transistor Q1 to the fourth switching transistor Q4 to be on or off, the parameter of the RC circuit 303 can be adjusted for adjusting the response speed of the loop compensation circuit. When the response speed of the loop compensation circuit 20 is close to or consistent with a variation rate of the output voltage of the voltage generation circuit, it can effectively reduce or eliminate the ripple and to raise the stability of the output voltage.

In the embodiment of the present invention, the loop compensation circuit comprises a voltage detection circuit, a control chip and a RC circuit, wherein the voltage detection circuit is coupled to a voltage generation circuit, and employed to detect a variation of an output voltage of the voltage generation circuit; the control chip is respectively coupled to the voltage detection circuit and the RC circuit, and employed to detect a response speed of the loop compensation circuit and to adjust a parameter of the RC circuit according to the response speed of the loop compensation circuit and the variation of the output voltage of the voltage generation circuit for adjusting the response speed of the loop compensation circuit. By employing the embodiment of the present invention, the response speed of the loop compensation circuit can be adjusted in real time to effectively reduce or eliminate the ripple and to raise the stability of the output voltage.

Figure 4:
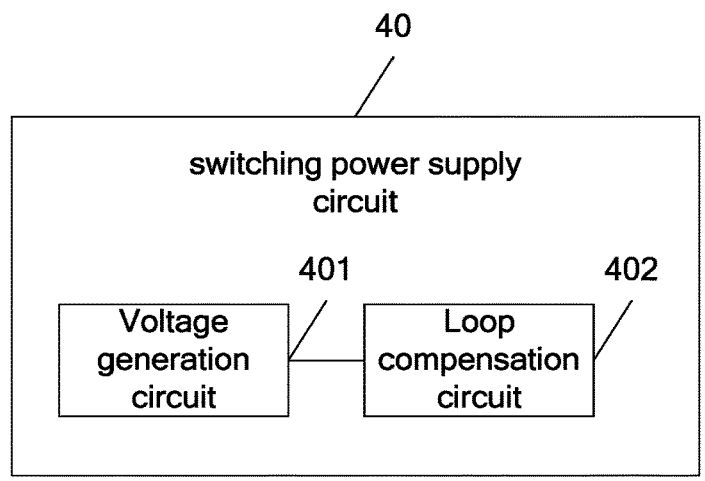
FIG. 4 is a structure diagram of one embodiment of a switching power supply circuit provided by the embodiment of the present invention.

Please refer to FIG. 4, which is a structure diagram of one embodiment of a switching power supply circuit provided by the embodiment of the present invention. As shown in FIG. 4, the switching power supply circuit 40 can comprise a voltage generation circuit 401 and a loop compensation circuit 402, wherein the loop compensation circuit 402 can be the loop compensation circuit described in any embodiment shown from FIG. 1 to FIG. 3. The specific implement can be referred to the specific description related from FIG. 1 to FIG. 3, and the repeated description is omitted here.

According to the related description from FIG. 1 to FIG. 3, the switching power supply circuit according to the embodiment of the present invention can adjust the response speed of the loop compensation circuit in real time to effectively reduce or eliminate the ripple and to raise the stability of the output voltage.

Above are embodiments of the present invention, which does not limit the scope of the present invention. Any modifications, equivalent replacements or improvements within the spirit and principles of the embodiment described above should be covered by the protected scope of the invention.

What is claimed is:

1. A loop compensation circuit, wherein the loop compensation circuit comprises a voltage detection circuit, a control chip and a RC circuit, wherein:
   the voltage detection circuit is coupled to a voltage generation circuit, and employed to detect a variation of an output voltage of the voltage generation circuit;
   the control chip is respectively coupled to the voltage detection circuit and the RC circuit, and employed to detect a response speed of the loop compensation circuit and to adjust a parameter of the RC circuit according to the response speed of the loop compensation circuit and the variation of the output voltage of the voltage generation circuit for adjusting the response speed of the loop compensation circuit;
   wherein the RC circuit comprises a resistance circuit, a capacitance circuit and a switching circuit, wherein the switching circuit is respectively coupled to the control chip, the resistance circuit and the capacitance circuit, and employed to be on or off according to a control signal outputted by the control chip to adjust a resistance value of the resistance circuit and a capacitance value of the capacitance circuit;
   wherein the resistance circuit comprises at least two resistances, and the capacitance circuit comprises at least two capacitances, and the switching circuit comprises at least two switching transistors;
   at least one resistance in the at least two resistances is coupled to at least one switching transistor in the switching circuit in series or in parallel; at least one capacitance in the at least two capacitances is coupled to at least one switching transistor in the switching circuit in series or in parallel;
   wherein the control chip comprises a control circuit and a PWM output circuit, wherein the control circuit is coupled to the voltage detection circuit, the RC circuit and the PWM output circuit, and employed to detect the response speed of the loop compensation circuit, and to control a Pulse Width Modulation PWM signal outputted by the PWM output circuit according to response speed of the loop compensation circuit and a variation of the output voltage;
   the PWM output circuit comprises at least two PWM output ends, and the at least two PWM output ends are coupled to the at least two switching transistors, and employed to respectively output PWM signals to the at least two switching transistors for controlling the at least two switching transistors to be on or off; and
   wherein the resistance circuit comprises a first resistance, a second resistance and a third resistance, and the switching circuit comprises a first switching transistor and a second switching transistor, wherein:
   the first resistance and the first switching transistor are connected in parallel and are coupled between the control circuit and one end of the second resistance in series;
   the third resistance and the second switching transistor are coupled between the control circuit and the other end of the second resistance in series;
   the first switching transistor and a second switching transistor are respectively coupled to the at least two PWM output ends.

2. The loop compensation circuit according to claim 1, wherein the at least two PWM output ends comprise a first PWM output end and a second PWM output end, and the first switching transistor and the second switching transistor are MOS transistors;
   a gate of the first switching transistor is coupled to the first PWM output end, and a source of the first switching transistor is coupled to one end of the first resistance and the control circuit, and a drain of the first switching transistor is coupled to the other end of the first resistance and one end of the second resistance;
   a gate of the second switching transistor is coupled to the second PWM output end, and a source of second switching transistor is coupled to the control circuit, and a drain of the second switching transistor is coupled to one end of the third resistance; the other end of the third resistance is coupled to the other end of the second resistance and the capacitance circuit.

3. The loop compensation circuit according to claim 1, wherein the capacitance circuit comprises a first capacitance, a second capacitance and a third capacitance, and the switching circuit comprises a third switching transistor and a fourth switching transistor, wherein:
   the first capacitance and the third switching transistor are connected in parallel and are coupled between grounding and one end of the second capacitance in series;
   the third capacitance and the fourth switching transistor are coupled between grounding and the other end of the second capacitance in series.

4. The loop compensation circuit according to claim 3, wherein the at least two PWM output ends comprises a third PWM output end and a fourth PWM output end, and the third switching transistor and the fourth switching transistor are MOS transistors;
   a gate of the third switching transistor is coupled to the third PWM output end, and a source and a drain of the third switching transistor are coupled to two ends of the first capacitance;
   the one end of the first capacitance is grounded, and the other end is coupled to one end of the second capacitance, and the other end of the second capacitance is coupled to one end of the third capacitance and the resistance circuit;
   a gate of the fourth switching transistor is coupled to the fourth PWM output end, and a source of the fourth switching transistor is grounded, and a drain of the fourth switching transistor is coupled to the other end of the third capacitance.

5. The loop compensation circuit according to claim 1, wherein the voltage detection circuit is a differentiating circuit.

6. A switching power supply circuit, wherein the switching power supply circuit comprises a voltage generation circuit and a loop compensation circuit, and the loop compensation circuit comprises a voltage detection circuit, a control chip and a RC circuit, wherein:
   the voltage detection circuit is coupled to the voltage generation circuit, and employed to detect a variation of an output voltage of the voltage generation circuit;
   the control chip is respectively coupled to the voltage detection circuit and the RC circuit, and employed to detect a response speed of the loop compensation circuit and to adjust a parameter of the RC circuit according to the response speed of the loop compensation circuit and the variation of the output voltage of the voltage generation circuit for adjusting the response speed of the loop compensation circuit;

wherein the RC circuit comprises a resistance circuit, a capacitance circuit and a switching circuit, wherein the switching circuit is respectively coupled to the control chip, the resistance circuit and the capacitance circuit, and employed to be on or off according to a control signal outputted by the control chip to adjust a resistance value of the resistance circuit and a capacitance value of the capacitance circuit;

wherein the resistance circuit comprises at least two resistances, and the capacitance circuit comprises at least two capacitances, and the switching circuit comprises at least two switching transistors;

at least one resistance in the at least two resistances is coupled to at least one switching transistor in the switching circuit in series or in parallel; at least one capacitance in the at least two capacitances is coupled to at least one switching transistor in the switching circuit in series or in parallel;

wherein the control chip comprises a control circuit and a PWM output circuit, wherein the control circuit is coupled to the voltage detection circuit, the RC circuit and the PWM output circuit, and employed to detect the response speed of the loop compensation circuit, and to control a Pulse Width Modulation PWM signal outputted by the PWM output circuit according to response speed of the loop compensation circuit and a variation of the output voltage;

the PWM output circuit comprises at least two PWM output ends, and the at least two PWM output ends are coupled to the at least two switching transistors, and employed to respectively output PWM signals to the at least two switching transistors for controlling the at least two switching transistors to be on or off; and wherein the resistance circuit comprises a first resistance, a second resistance and a third resistance, and the switching circuit comprises a first switching transistor and a second switching transistor, wherein:

the first resistance and the first switching transistor are connected in parallel and are coupled between the control circuit and one end of the second resistance in series;

the third resistance and the second switching transistor are coupled between the control circuit and the other end of the second resistance in series;

the first switching transistor and a second switching transistor are respectively coupled to the at least two PWM output ends.

7. The switching power supply circuit according to claim 6,
wherein the at least two PWM output ends comprise a first PWM output end and a second PWM output end, and the first switching transistor and the second switching transistor are MOS transistors;
a gate of the first switching transistor is coupled to the first PWM output end, and a source of the first switching transistor is coupled to one end of the first resistance and the control circuit, and a drain of the first switching transistor is coupled to the other end of the first resistance and one end of the second resistance;
a gate of the second switching transistor is coupled to the second PWM output end, and a source of second switching transistor is coupled to the control circuit, and a drain of the second switching transistor is coupled to one end of the third resistance; the other end of the third resistance is coupled to the other end of the second resistance and the capacitance circuit.

8. The switching power supply circuit according to claim 6, wherein the capacitance circuit comprises a first capacitance, a second capacitance and a third capacitance, and the switching circuit comprises a third switching transistor and a fourth switching transistor, wherein:
the first capacitance and the third switching transistor are connected in parallel and are coupled between grounding and one end of the second capacitance in series;
the third capacitance and the fourth switching transistor are coupled between grounding and the other end of the second capacitance in series.

9. The switching power supply circuit according to claim 8, wherein the at least two PWM output ends comprises a third PWM output end and a fourth PWM output end, and the third switching transistor and the fourth switching transistor are MOS transistors;
a gate of the third switching transistor is coupled to the third PWM output end, and a source and a drain of the third switching transistor are coupled to two ends of the first capacitance;
the one end of the first capacitance is grounded, and the other end is coupled to one end of the second capacitance, and the other end of the second capacitance is coupled to one end of the third capacitance and the resistance circuit;
a gate of the fourth switching transistor is coupled to the fourth PWM output end, and a source of the fourth switching transistor is grounded, and a drain of the fourth switching transistor is coupled to the other end of the third capacitance.

10. The switching power supply circuit according to claim 6, wherein the voltage detection circuit is a differentiating circuit.

* * * * *